(12) United States Patent
Matsumoto et al.

(10) Patent No.: US 6,651,717 B2
(45) Date of Patent: Nov. 25, 2003

(54) TAPING MACHINE

(75) Inventors: Kazuyuki Matsumoto, Tokyo-to (JP); Takashi Kawamura, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 21 days.

(21) Appl. No.: 09/973,594

(22) Filed: Oct. 9, 2001

(65) Prior Publication Data

US 2002/0059983 A1 May 23, 2002

(30) Foreign Application Priority Data

Nov. 10, 2000 (JP) ........................................ 2000-343311
Apr. 4, 2001 (JP) ........................................ 2001-106091

(51) Int. Cl.$^7$ .......................... B32B 31/00; B32B 35/00
(52) U.S. Cl. ........................ 156/379; 156/468; 156/486; 156/489; 156/523; 156/574
(58) Field of Search ................................ 156/459, 468, 156/489, 486, 523, 574, 109, 107, 379

(56) References Cited

U.S. PATENT DOCUMENTS

| | | | | | |
|---|---|---|---|---|---|
| 3,391,805 A | * | 7/1968 | Baden | ..................... | 414/791.3 |
| 3,733,237 A | * | 5/1973 | Wolff | ......................... | 156/468 |
| 3,790,003 A | * | 2/1974 | Tausheck | ..................... | 414/494 |
| 3,919,038 A | * | 11/1975 | Davis | ......................... | 156/511 |
| 5,416,757 A | * | 5/1995 | Luecke et al. | ........... | 369/44.23 |
| 5,439,549 A | * | 8/1995 | Fryc et al. | .................. | 156/461 |
| 5,699,131 A | * | 12/1997 | Aoki et al. | ................. | 348/832 |
| 5,726,705 A | * | 3/1998 | Imanishi et al. | .............. | 348/92 |
| 6,113,513 A | * | 9/2000 | Itoh et al. | ..................... | 476/10 |
| 6,378,586 B1 | * | 4/2002 | Lafond | ....................... | 156/362 |

* cited by examiner

*Primary Examiner*—Richard Crispino
*Assistant Examiner*—Cheryl N. Hawkins
(74) *Attorney, Agent, or Firm*—Ladas & Parry

(57) ABSTRACT

Provided is a taping machine which enables shortening the time length for bonding to each other a Fresnel lens sheet and a lenticular lens sheet and for the inspection process as well as reducing the space occupied by apparatuses used for the both processes. The taping machine includes a table part that has placed thereon a Fresnel lens sheet and a lenticular lens sheet with the end surfaces thereof being regularly arranged and superposed over upon the other, and a tape-applying mechanism that bonds the end surfaces to each other by means of a tape. The table part has a black-colored opaque plate on which a transparent plate is mounted.

8 Claims, 3 Drawing Sheets

TAPING MACHINE

BACKGROUND OF THE INVENTION

1. Field of the Invention

The present invention relates to a bonding-to-each-other machine for bonding to each other a Fresenl lens sheet and a lenticular lens sheet that are used in a projection screen.

2. Description of the Related Art

In a projection screen, a Fresnel lens sheet and a lenticular lens sheet are disposed in the way they are superposed one upon the other. These lens sheets are manufactured respectively separately. Thereafter, the end surfaces thereof are regularly arranged and then superposed one upon the other. Thereby, the end surface portions are bonded to each other by means of a tape. Also, inspection is made of whether there are defects in the surface or interior of each lens sheet that has been created during the manufacture, or of whether the lens sheet has flaws created during its storage or a time period in which it is being handled.

However, each of the Fresnel lens sheet and the lenticular lens sheet is a product the size of that usually is as great as 40 to 80 inches. Accordingly, a significantly large length of time has hitherto been needed for the mutual tape bond process as well as for the inspection operation. In addition, the space that an apparatus for inspection occupies is as large as the size is non-ignorable. This has imposed a great limitation upon the disposition of the apparatus within the factory or the space for intermediate custody of the parts. Accordingly, there has been a demand for managing to reduce the time length, or the space, needed for the tape bonding or the inspection.

SUMMARY OF THE INVENTION

Thereupon, the present invention has been made under the above-described existing circumstances and has an object to provide a taping machine which enables shortening the time length for bonding to each other a Fresnel lens sheet and a lenticular lens sheet, as well as shortening the time length for the inspection process, and reducing the spaces occupied by the apparatuses for both the mutual tape bond process and the inspection process.

The present invention will hereafter be explained.

A first aspect of the present invention solves the above-described problems by providing a taping machine comprising a table part that can have placed thereon a Fresnel lens sheet and a lenticular lens sheet with the end surfaces thereof being regularly arranged and superposed over upon the other, and a tape-applying mechanism that bonds the end surfaces to each other by means of a tape.

According to this aspect, the tape-applying mechanism and the table part are constructed integrally with each other. Therefore, taping can be performed with the both lens sheets being fixed on the table part.

In this aspect, the table part may be constructed to have a black-colored opaque plate on which a transparent plate is mounted, and is thereby to be an inspection base that is for the purpose of finding out defects of the Fresnel lens sheet and the lenticular lens sheet.

According to this aspect of invention, the tape-applying mechanism and the inspection base are constructed integrally with each other. Therefore, while the end surfaces of the both lens sheets are being bonded together by the tape, it is possible to inspect the both lens sheets at least at anyone time (including combined times) of a time simultaneous with bonding to each other, a time immediately before bonding-to-each-other of them, and a time immediately thereafter. Also, because the two appliances are constructed integrally with each other, it is possible to achieve the reduction in space. Further, it is possible to execute by one operator the bonding process and the inspection process which have hitherto been carried out by two operators and therefore this can contribute to enhancing the productivity. Also, if the invention is constructed as above, it is possible for the operator to observe in a state where flaws or defects of each lens sheet are as if they were floated upwards from the black-colored opaque plate. So the operator does not overlook them and can highly efficiently perform the inspection operation. In addition, as a transparent plate is attached over the black-colored opaque plate, the black-colored opaque plate is prevented from being flawed by each of the both lenses. Therefore, it is possible to maintain the black color of the opaque plate over a long term.

Also, in this aspect, the tape-applying mechanism may be constructed in such a way as to include a nip unit that fixes the end surfaces of both lens sheet that are regularly arranged and superposed one upon the other, and a tape-applying unit that bonds to each other by means of the tape the end surfaces of the both lens sheets that are regularly arranged and superposed one upon the other.

If such is done like such, because the bonding process is performed with the both lens sheets being kept fixed, it is possible to bond the tape to the end surfaces of the both lenses reliably.

Also, in this aspect, it may be constructed in the way that the nip unit has a pair of fixing arms that, while a predetermined distance is being maintained from the end surfaces of the both lens sheets that are regularly arranged and superposed one upon the other, presses the both lens sheets from the obverse and reverse of a combined unit of the lens sheets. And on the surfaces of the paire of fixing arms at which they contact with the both lens sheets and the lenticular lens sheet there are mounted contact members each of that is formed of a material the hardness of that is lower than the material constituting the both lens sheets.

By constructing like that, it is possible to pinch the both lenses by and between the fixing arms and firmly fixing them. Also, because a material that is low in hardness is used on each of the contact portions between the fixing arms and the both lenses, flaws to be formed in the surface of each of the both lens sheets are prevented.

Further, in this aspect, it may be constructed in the way that the tape-applying unit includes a tape supply part that has a predetermined tape set thereto and supplies it, a tape-applying part that applies the tape it has received from the tape supply part to the end surfaces of the both lens sheets, and a moving mechanism that reciprocatingly moves the tape supply part and the tape-applying part along the end surface of the table part.

By employing such a construction, the tape that has been prepared beforehand can be bonded to the end surfaces of the both lens sheets while moving the tape along these end surfaces.

In the above-described aspect, the invention may be constructed in the way that the tape-applying part includes tape guides that draws out the tape from the tape supply part, pressing members that press the tape, which has been drawn from the tape guides, to the end surfaces of the both lens sheets, a pair of bending members that, regarding the tape having been pressed by the pressing members, bend the portion of that tape which has been stuck out from the end surfaces of the lens sheets, a pair of bonding members that, regarding the tape having been bent to the sheet side by the pair of bending members, pressure-bond this tape to the sheet side of the both lens sheets in the way the tape is pinched to the sheet surface side, and a cutter device that cuts the tape at a predetermined position.

In case the invention is constructed like that, the tape that has been drawn out from the tape supply part by means of the tape guides is pressed to the end surfaces of the both lens sheets by the pressing members. Both ends of the tape are bent to the sheet-surface side of the lens sheets by means of the pair of bending members. Further, those both ends of the tape are bonded to the sheet surfaces by means of the bonding members, and then is cut at a predetermined position by the cutter device. No operator's time and labor are needed for executing the tape-applying operation. Accordingly, it is possible to achieve the automation of the tape-applying operation.

Also, in the above-described aspect, the invention may be constructed in the way that the moving mechanism includes a residual-amount-of-tape-alarming device that, when the residual amount of tape has become a predetermined value, rings an alarm.

If such is done like that, it is possible to prevent the residual amount of tape from running out in the mid-course of the the operation at the end surface, and to prevent such a situation where the operation is re-performed from occurring as a result of that.

Further, in the above-described aspect, the invention may be constructed in the way the moving mechanism is constructed so that the return speed thereof may be higher than the moving speed at the time of tape bonding.

If the invention is constructed like that, it is possible to further enhance the operating efficiency of the taping machine.

The above-described functions and advantages of the present invention will become apparent from the embodiment that will be explained next.

DESCRIPTION OF THE PREFERRED EMBODIMENTS

Figure 1:
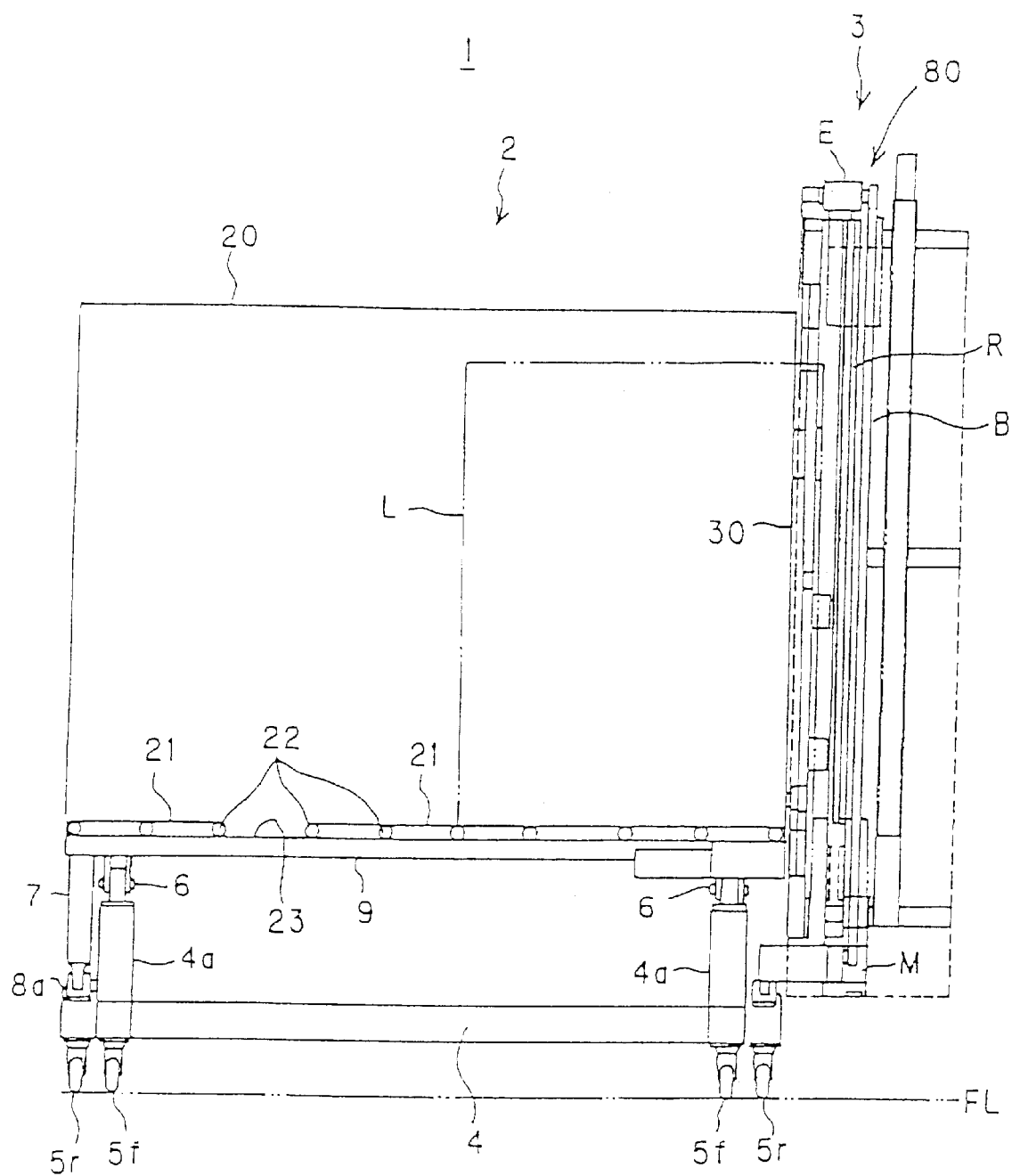
FIG. 1 is a front view illustrating a taping machine.
Figure 2:
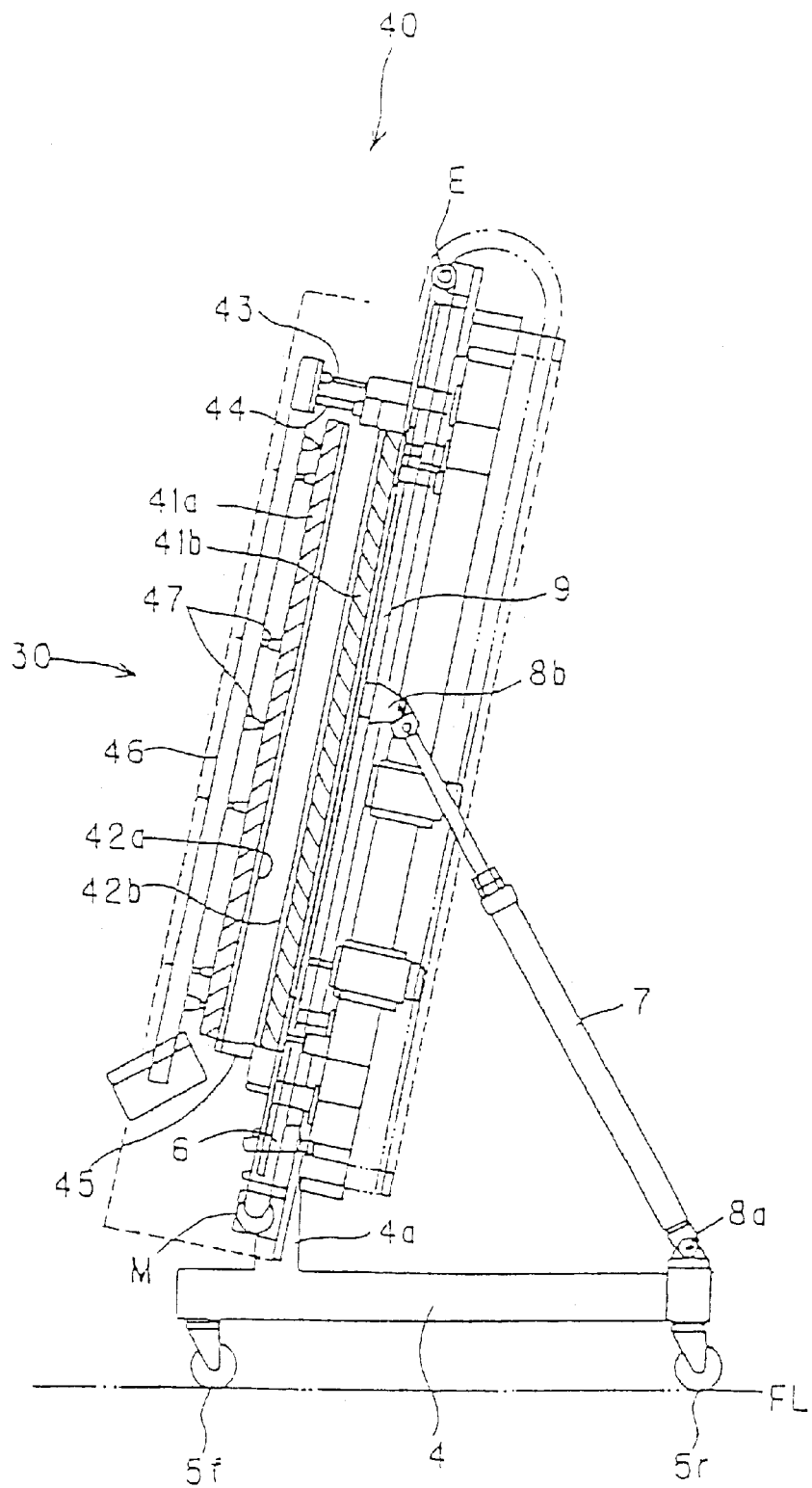
FIG. 2 is a side view illustrating the taping machine.

The present invention will hereafter be explained on the basis of the embodiment illustrated in the appended drawings. First, the entire construction of a taping machine according to the present invention, and subsequently the details of each constituent portion, will be explained with reference to FIGS. 1 and 2 as well as to FIG. 3. Incidentally, in the following explanation, the front/back and the right/left are expressed on the basis of the direction to which the taping machine 1 is directed. For example, the "left" side of the taping machine 1 assumedly represents the right side in FIG. 1. The "front" side of the taping machine 1 assumedly represents the left side in FIG. 2.

On a base 4 that is placed on the floor surface there is mounted a substrate 9 via expansion/contraction mechanism 7, 7. On the substrate 9 there are mounted an inspection base 2 and tape-applying mechanism 3 which constitute main parts of the taping machine 1.

On the base 4, four-in-all casters 5f, 5f, 5r, 5r are mounted, namely, at two positions at the front part of the underside thereof and at two positions at the rear part of it. It is arranged that each of these casters be movable on the floor surface FL to a given position. It is to be noted that at the time of ordinary use stoppers not illustrated that are provided on each of the casters 5f, 5f, 5r, and 5r are applied thereto. Thereby, the stoppers are in use by being fixed respectively to predetermined positions of the floor surface. Upright portions 4a, 4a are provided on the left/right positions of the front/upper surface of the base 4. At the forward ends of the upright portions 4a, 4a there are mounted pivoting mechanisms 6, 6, respectively. On the left and right positions of the rear/upper surface of the base 4 there are attached the expansion/contraction mechanisms 7, 7 via pivoting mechanisms 8a, 8a. Pivoting mechanisms 8a, 8a are attached on the front end portion of the expansion/contraction mechanisms 7, 7. These four pivoting mechanisms 6, 6, 8a, 8a are mounted on the underside of the substrate 9. Through the flexibility of the expansion/contraction mechanisms 7, 7, the inclination of the substrate 9 is varied. Therefore, the substrate 9 can be set to a given angle of inclination. The substrate 9 can be adjusted to within a range from 10 degrees to 30 degrees inclusive. The inclination-adjusting mechanism can be fixed to a given angle of inclination.

To the substrate 9 is attached the inspection base 2 in the direction in which it is directed toward the front surface thereof. And to that substrate 9 is also attached the tape-applying mechanism 3 at the left side-surface portion (the right side in FIG. 1).

The inspection base 2 includes a table 20 that can place thereon a Fresnel lens sheet and a lenticular lens sheet in the way their end surfaces are regularly arranged and superposed one upon the other. The table 20 has a black-colored opaque plate on which a transparent plate is bonded thereto. As the black-colored opaque plate there is ordinarily used a black-colored acrylic plate. Provided, however, that the present invention is not limited thereto. If the plate used is black colored and planar, the invention on principle permits the use of that plate. The reason why that plate is black colored is that it is easy to find out defects or flaws of the Fresnel lens sheet or the lenticular lens sheet. However, when the both lens sheets are placed directly on the black-colored opaque plate and this plate is repeatedly used for inspection therefor, the black-colored opaque plate surface is repeatedly rubbed by the both lens sheets. As a result, flaws are caused to that surface, with the result that it gradually becomes white. To avoid this, the transparent plate is bonded to the black-colored opaque plate. The material of the transparent plate may be plastic such as acrylic material or polystyrene. But, from the viewpoint of being unlikely to have flaws formed therein, the use of a glass plate is recommended.

On the lower end of the front surface of the table 20, over the entire length thereof, there are attached product receivers 21 for receiving thereon the both lens sheet L. However, as regards a part of the length, a notched portion 23 is provided so as to easily dispose the both lens sheets on the table 20. The product receivers 21 are fitted with a number of rollers 22, 22, 22, - - -, 22 so as to make the both lenses easy to slide on the table 20 in the horizontal direction (the left/right direction in FIG. 1). On a side where the rollers 22, 22, 22, - - - contact with the table there are formed concavities so that the lower end surfaces of the both lens sheets may be fitted into those concavities. In view of wear prevention, it is recommended that stainless steel such as SUS 430 or SUS 304 or the like is used as the material for the roller. The width of each concavity of the roller is made somewhat greater than the total thickness of the both lens sheets. For example, preferably, that width is made to be 2 to 5 mm or so. The depth of the concavity is set to be at a value that is necessary and sufficient for it to stably receive therein the both lens sheets. For example, preferably, that depth is set to be 1 to 3 mm. Incidentally, below the left (the right side in FIG. 1) side of the table 20 there are suitably attached a switch box, an operation box, etc. for operating the inspection base 2 and the tape-applying mechanism 3. The attaching positions of this switch box and operation box preferably are located on the left side from the center of the table. This is from the standpoint of that the tape-applying mechanism 3 is disposed on the left side of the machine and therefore the machine as a whole is easy for the operator to operate and monitor.

The tape-applying mechanism 3 includes a nip unit 40 that fixes the both lens sheets the end surfaces of that are regularly arranged and superposed one upon the other, and a tape-applying unit 50 that bonds using the tape the end surfaces of the both lens sheets L that have been fixed by the nip unit 40.

The nip unit 40 includes a pair of air cylinders, one of which is an upper air cylinder 43 attached to an upper part of a left side end portion (the right side in FIG. 1) of the substrate 9 and the other of which is a lower air cylinder 44 attached to a lower part of that left side end portion. It further includes a support member 46 that is attached to forward end portions of the air cylinders 43, 44 in the way it is vertically directed and that is moved by the expansion/contraction of the cylinder while being kept in parallel with the table 20, a forward fixing arm 41a that is mounted to a table-20-side of the support member 46 via attaching members 47, 47, 47, - - - so that it may be parallel with the table surface, and a rear fixing arm 41b that has been mounted to a left/front surface of the substrate 9 so that it may oppose the forward fixing arm 41b. To the mutually opposing surfaces of the both fixing arms 41a, 41b there are attached contact members 42a, 42b each of that is formed of a material the hardness of that is lower than that of the material constituting each of the both lens sheets L. The height that extends toward the opposite surface of the contact member 42b mounted on the rear fixing arm 41b is set to be the one which is slightly greater than that of the front surface of the table 20. For the material of each contact member 42a, 42b, on principle, it is possible to use a material the hardness of that is lower than that of the material constituting each of the both lens sheets L, such as natural rubber, synthetic rubber, foamed synthetic resin, non-woven fabric, or paper. Further, in case the wear resistance, the prevention of the contact member from transfer-bond onto the lens sheet L, the prevention of it from degradation due to its long-term use, etc. are taken into consideration, the use of silicone rubber is recommended.

Next, an explanation will be given of the function of the nip unit 40. First, the air cylinders 43, 44 are expanded to thereby sufficiently spread the distance between the contact members 42a and 42b. The both lens sheets L the end surfaces of that have been regularly arranged and superposed one upon the other are placed on the table 20 of the inspection base 2. Then they are dragged or moved toward the right side of FIG. 1 and are thereby disposed so that the left end surfaces of the both lens sheets L may be stuck out from the end surface of the table 20 by a predetermined length (e.g. 5 to 10 cm) in the rightward direction of the illustration. Next, the air cylinders 43, 44 are contracted. As a result of this, the both lens sheets L are fixed by being pressed from both the obverse and the reverse thereof by the contact members 42a, 42b. In this case, because the rear-side contact member 42b is slightly press-contacted by that pressing, the height thereof becomes the same as that of the front surface of the table 20. Accordingly, the lower-surface side of the both lens sheets L is stably fixed on one plane the front surface of the table 20 and the rear contact member 42b form in the way they are integrated with each other.

It is to be noted that the rear-side fixing arm 41b may be movable while being kept in parallel with the surface of the tape in accordance with the flexibility of the air cylinders 43, 44 in the same way as the forward-side fixing arm 41a is. In this case, in a state where the lens sheets L are kept not pinched between the arms 41a, 41b, the constraint surface of the lens sheets L at which the lens sheets L are constrained by the rear fixing arm 41b (in the illustrated example the surface of the contact member 42b) is set to be at a position lower than that corresponding to the front surface of the table 20 (namely a position retracted from the front surface of the table 20) beforehand. And when the forward fixing arm 41a and the rear fixing arm 41b are moved toward the lens-sheet side and the lens sheets have thereby been fixed between them, the positions of the respective arms 41a and 41b are set so that the surface of the contact member 42b may have the same height as that corresponding to the front surface of the table 20. If such is done like such, the lens sheets L can be moved horizontally of the table 20 in a state where the constraint surface of the rear fixing arm 41b is lower than the front surface of the table 20. And therefore there is the merit that, during that movement, the lens sheets L are kept out of contact with the rear fixing arm 41b.

The tape-applying unit 50 includes a tape supply part 60 to which a predetermined tape is set and which supplies it, a tape-applying part 70 which bonds the tape supplied from the tape supply part 60 to the end surfaces of the both lens sheets L that are regularly arranged and superposed one upon the other, and a moving mechanism 80 that reciprocatingly moves the tape supply part 60 and the tape-applying part 70 along the end surface of the inspection base.

The moving mechanism 80 includes a motor M that has been mounted on the upper surface of the left end portion of the base 4, encoder-equipped rollers ER that have been mounted on the upper part of the left end of the substrate 9, a belt B that is bridged over this motor M and rollers ER, and a mount part 82 that is mounted to a carriage 81 having accommodated therein the tape supply part 60 and the tape-applying part 70. Further, the moving mechanism 80 is equipped with a rail R that has been mounted on the substrate 9 in parallel with the leftward end surface of the table 20. It is there by arranged that the carriage 81 can be moved on the rail R.

Assume that the motor M be driven. Then, the drive force is transmitted to the belt B. Thereby, the carriage 81 that has been mounted to the belt B via the mount part 82 is moved on the rail R upward or downward. The position of the carriage 81 is always sensed by means of the encoder and is fed back to a machine control apparatus not illustrated. Accordingly, if the length of the portion by which the both lens sheets are bonded together is input into the control apparatus beforehand, the movement of the motor M is controlled so that the carriage 81 maybe reciprocatingly moved over a predetermined range according to the size of the both lens sheets at the moment. It is to be noted that, when measured relative to the speed of the going movement of the carriage 81 during the tape-application process from the origin to a predetermined point, the speed of the returning movement for causing the carriage 81 to return from that predetermined point to the origin, preferably, is set to be 1.5 to 3 times as high as the speed of that going movement. The reason for this is for the purpose of enhancing the efficiency of the relevant operations as a whole while a stable tape-application process is being ensured.

Further, in the above-described control apparatus, it may be arranged that the length of the tape as later described be input beforehand and this length be made to correspond to the length of the tape to be bonded during the going movement. And it may be arranged that when the residual amount of tape has reached a predetermined value a buzzer, for example, beeps an alarming sound. Or, it may be arranged that together with beeping an alarming sound the reciprocating movement be stopped at the position at which tape application is completed at that moment to thereby advise the operator of his performing the tape-exchanging operation. If such is done like that, it is possible to prevent the occurrence of an accident in which in the course of the end surface of the lens sheet the residual amount of tape becomes zero and as a result the operation is obliged to be interrupted.

Figure 3:
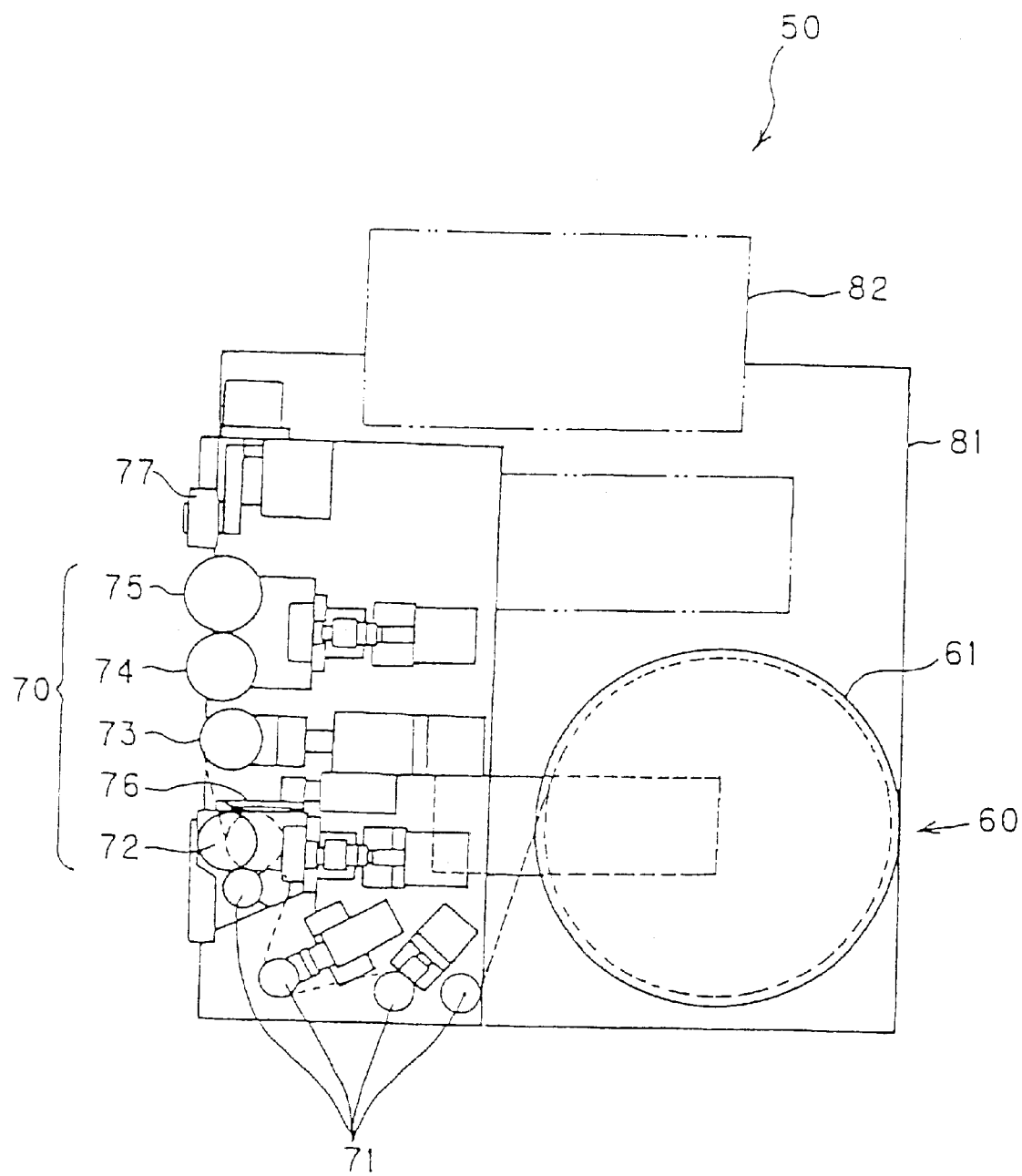
FIG. 3 is a view illustrating a tape supply part and a tape-applying part.

Subsequently, the tape supply part 60 and the tape-applying part 70 will be explained with reference to FIG. 3. The tape supply part 60 includes a guide wheel 61 the diameter size of that is set so that a commercially available adhesive tape may be set thereon. The guide wheel 61 is freely rotatably mounted on the carriage 81 and is constructed so as to freely supply the tape that is pulled by a tape-applying part 70 as later described.

The tape-applying part 70 includes tape guides 71 that draw out the tape from the tape supply part 60, pressing members 72, 73 that press the tape drawn out by the tape guides 71 against the end surfaces of the both lens sheet L, a pair of bending members 74, 75 that bend that portion of the tape, pressed by the pressing members 72, 73, which has been stuck out from the end surface to the sheet surface side of the both lenses, a pair of bonding members 77 that press the tape having bent to the sheet side by the pair of bending members 74, 75 so as to pinch this tape onto the sheet surface side of the both lenses, and a cutter blade 76 for cutting the tape at a predetermined position. These tape guides 71, pressing members 72, 73, bending members 74, 75, bonding members 77, 77, and cutter blade 76 are mounted on the forward end portions of air cylinders mounted on the carriage 81. The encoder always monitors the position of the carriage 81 and thereby feeds this information back to the control apparatus. Each of those air cylinders is controlled so that it may be expanded or contracted at a predetermined position and with a predetermined piece of timing. As a result of this, the tape is bonded to the end surfaces of the both lens sheets, whereby its both side-end portions are bent in to the lens surface side and are further bonded and are cut at a predetermined position thereof.

The portions of the tape guides 71 that are contacted with the adhesive agent of the tape preferably are subjected to Teflon coating or the like to thereby prevent the tape from being stuck onto those portions, resulting in an unexpected machine trouble. In case constructing the tape guides 71 and pressing members 72, 73 with use of rollers, it is preferable to form flanged portions on the side surfaces of the rollers so as to prevent the tape from falling off from the travelling surface thereof. Also, in case constructing the bending members 74, 75 with use of rollers, for causing smooth bend-in of the tape toward the lens surface, the rollers may each be a tapered roller. In the example of FIG. 3, each of the pressing members 72, 73 and bending members 74, 75 is constructed of a single roller, the outer-peripheral surface of that has formed therein a V-shaped groove for bending the tape. In addition, the taper of the groove formed in one of the rollers 74, 75 is different from that formed in the other.

Incidentally, in the above-explained taping machine, there has been illustrated an example wherein the tape-applying mechanism is provided on the left side of the inspection base. However, the present invention is not limited thereto. In the present invention, the tape-applying mechanism may be provided at an upper or lower part, or on a right side or on both side and the right side, of the inspection base, without departing from the range wherein the operation can smoothly be carried out.

The present invention is not limited to the above-described embodiment but permits changes or modifications to be suitably made without running counter to the subject matter or idea of the invention that can be read from the claims and the entire specification. Such taping machines that have been so changed or modified are also included within the technical scope of the present invention.

As has been explained above, according to the taping machine comprising a table part that can have placed thereon a Fresnel lens sheet and a lenticular lens sheet with the end surfaces thereof being regularly arranged and superposed over upon the other, and a tape-applying mechanism that bonds the end surfaces to each other by means of a tape, since the tape-applying mechanism and the table part are constructed in the way they are integrated with each other, the taping can be performed with the both lens sheets being fixed to the table part.

Also, if in this mode of invention it is arranged that the table part be constructed to have a black-colored opaque plate on which a transparent plate is mounted, and this table is thereby used as an inspection base that is for the purpose of finding out defects of the Fresnel lens sheet and the lenticular lens sheet, since the taping machine and the inspection base are integrally constructed, the following effect is obtained. While the end surfaces of the both lens sheets are being bonded together by the tape, it is possible to inspect the both lens sheets at least at any one time (including combined times) of a time simultaneous with bonding to each other, a time immediately before bonding-to-each-other of them, and a time immediately thereafter. Also, because the two appliances are constructed integrally with each other, it is possible to achieve the reduction in the space. Further, it is possible to execute by one operator the bonding process and the inspection process which have hitherto been carried out by two operators and therefore this can contribute to enhancing the productivity. Also, if the invention is constructed as above, it is possible for the operator to observe in a state where flaws or defects of each lens sheet are as if they were floated upwards from the black-colored opaque plate. So the operator does not overlook them and can highly efficiently perform the inspection operation. In addition, a transparent plate is attached over the black-colored opaque plate. Therefore, the black-colored opaque plate is prevented from being flawed by each of the both lenses. Therefore, it is possible to maintain the black color of the opaque plate over a long term of use.

Also, in this aspect, if the tape-applying mechanism is constructed in such a way as to include a nip unit that fixes the Fresnel lens sheet and the lenticular lens sheet the end surfaces of that are regularly arranged and superposed one upon the other, and a tape-applying unit that bonds to each other by means of the tape the end surfaces of the both lens sheets that are regularly arranged and superposed one upon the other, because the bonding process is performed with the both lens sheets being kept fixed, it is possible to bond the tape to the end surfaces of the both lenses reliably.

Also, if the invention is constructed in the way that the nip unit has a pair of fixing arms that while a predetermined distance is being maintained from the end surfaces of the both lens sheets that are regularly arranged and superposed one upon the other press the both lens sheets from the obverse and reverse of a combined unit of the lens sheets, and if on the surfaces of the paired fixing arms at which they contact with the both lens sheets and the lenticular lens sheet there are mounted contact members each of that is formed of a material the hardness of that is lower than the material constituting the both lens sheets, it is possible to pinch the both lenses by and between the fixing arms and firmly fix them. Also, because a material that is low in hardness is used on each of the contact portions between the fixing arms and the both lenses, that flaws will be formed in the surface of each of the both lens sheets is prevented.

Further, if the invention is constructed in the way that the tape-applying unit includes a tape supply part that has a predetermined tape set thereto and supplies it, a tape-applying part that applies the tape it has received from the tape supply part to the end surfaces of the both lens sheets, and a moving mechanism that reciprocatingly moves the tape supply part and the tape-applying part along the end surface of the table part, the tape that has been prepared beforehand can be bonded to the end surfaces of the both lens sheets while moving the tape along these end surfaces.

Also, if the tape-applying part includes tape guides that draws out the tape from the tape supply part, pressing members that press the tape, which has been drawn out from the tape guides, to the end surfaces of the both lens sheets, a pair of bending members that, regarding the tape having been pressed by the pressing members, bend the portion of that tape which has been stuck out from the end surfaces of the lens sheets to the sheet surface side of the both lenses, a pair of bonding members that, regarding the tape having been bent to the sheet side by the pair of bending members, pressure-bond this tape to the sheet side of the both lens sheets in the way the tape is pinched to the sheet surface side, and cutter device that cuts the tape at a predetermined position, the tape that has been drawn out from the tape supply part by means of the tape guides is pressed to the end surfaces of the both lens sheets by the pressing members. And both ends of the tape are bent to the sheet-surface side of the lens sheets by means of the pair of bending members. Further, those both ends of the tape are bonded to the sheet surfaces by device of the bonding members, and then are cut at a predetermined position by the cutter device. No operator's time and labor are needed for executing the tape-applying operation. Accordingly, it is possible to achieve the automation of the tape-applying operation.

Also, if the invention is constructed in the way that the moving mechanism includes a residual-amount-of-tape-alarming device that, when the residual amount of tape has become a predetermined value, rings an alarm, it is possible to prevent the residual amount of tape from becoming zero in the mid-course of the end surface and to prevent an accident where the operation is re-performed from occurring as a result of that.

Further, if the invention may be constructed in the way the moving mechanism is constructed so that the return speed thereof may be higher than the moving speed at the time of tape bonding, it is possible to further enhance the operating efficiency of the taping machine.

What is claimed is:

1. A taping machine comprising:
    a table part having product receivers for receiving thereon a Fresnel lens sheet and a lenticular lens sheet on the lower end of a front surface, that aligns edges of both the lens sheets and places the sheets in layers;
    a tape-applying mechanism that bonds the end surfaces of each lens sheet to each other by means of a tape; and
    a pivoting mechanism for adjusting an angle of inclination of the table part.

2. A taping machine according to claim 1, wherein the table part has a black-colored opaque plate on which a transparent plate is mounted, and is an inspection base that is for the purpose of inspecting for defects of the Fresnel lens sheet and the lenticular lens sheet.

3. A taping machine according to claim 1, wherein the tape-applying mechanism includes a nip unit that fixes in place the aligned Fresnel lens sheet and lenticular lens sheet so that the tape-applying unit may bond the end surfaces of the Fresnel lens sheet and the lenticular lens sheet.

4. A taping machine according to claim 3, wherein the nip unit has a pair of fixing arms that, while a predetermined distance is maintained from the end surfaces of the aligned Fresnel lens sheet and lenticular lens sheet, press an obverse and a reverse of a combined unit of the Fresnel lens sheet and lenticular lens sheet and fixes said combined unit in place; and on the surfaces of the pair of fixing arms which contact with the Fresnel lens sheet and the lenticular lens sheet there are mounted contact members, said contact members being formed of a material having a hardness which is lower than materials constituting the Fresnel lens sheet and the lenticular lens sheet.

5. A taping machine according to claim 3, wherein the tape-applying unit includes a tape supply part that has a predetermined tape set thereto, a tape-applying part that applies the tape received from the tape supply part to the end surfaces of the aligned Fresnel lens sheet and lenticular lens sheet, and a moving mechanism that reciprocatingly moves the tape supply part and the tape-applying part along an end surface of the table part.

6. A taping machine according to claim 5, wherein the tape-applying part includes:
    tape guides that draw out the tape from the tape supply part;
    pressing members that press the tape, which has been drawn from the tape guides, to the end surfaces of the aligned Fresnel lens sheet and lenticular lens sheet;
    a pair of bending members that, regarding the tape having been pressed by the pressing members, bend a portion of that tape which has been stuck out from the end surfaces of the lens sheets to sides of the Fresnel lens sheet and lenticular lens sheet;
    a pair of bonding members that, regarding the tape having been bent to the lens sheet sides by the pair of bending members, pressure-bonds the tape to the sheet sides of the Fresnel lens sheet and lenticular lens sheet so that the tape is pinched to the lens sheet surface sides; and
    a cutter device that cuts the tape at a predetermined position.

7. A taping machine according to claim 5, wherein the moving mechanism includes a residual-amount-of-tape-alarming device that, when the residual amount of the tape has become a predetermined value, rings an alarm.

8. A taping machine according to claim 5, wherein the moving mechanism is constructed so that a return speed thereof is higher than a moving speed at a time of tape bonding.

* * * * *